May 21, 1968  J. M. GALIMBERTI ET AL  3,383,748
CUTTING INSERT
Filed June 16, 1966  2 Sheets-Sheet 2
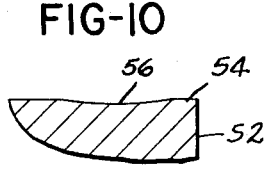
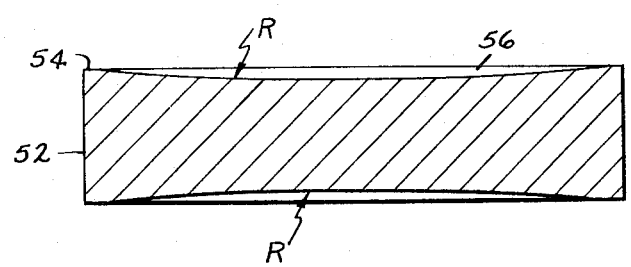
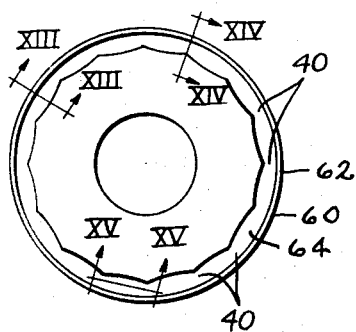
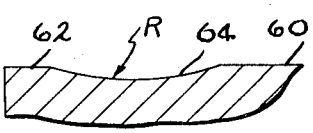
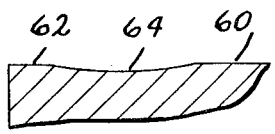
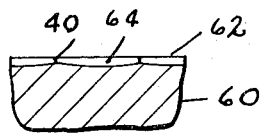
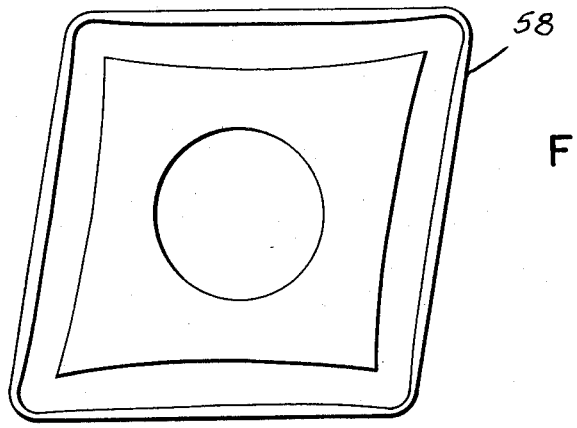
INVENTOR.
JAMES M. GALIMBERTI
DENNIS G. JONES
BY
Melvin A. Crosby United States Patent Office 3,383,748
Patented May 21, 1968

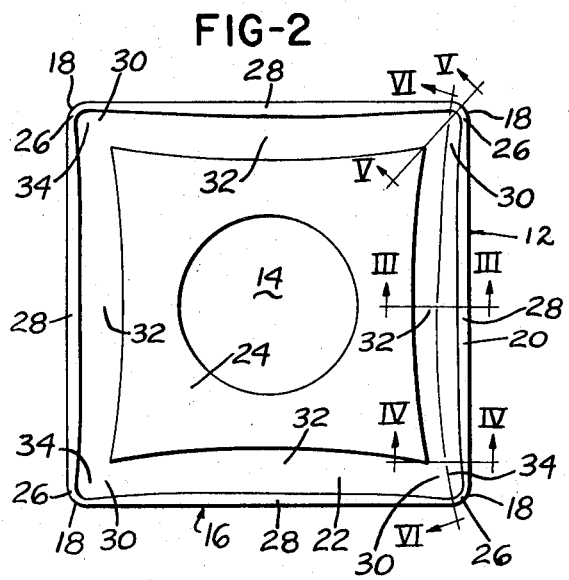
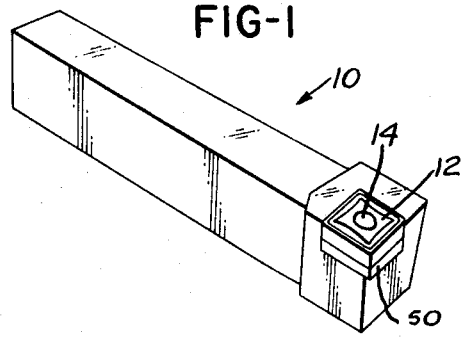
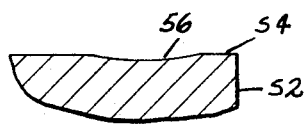
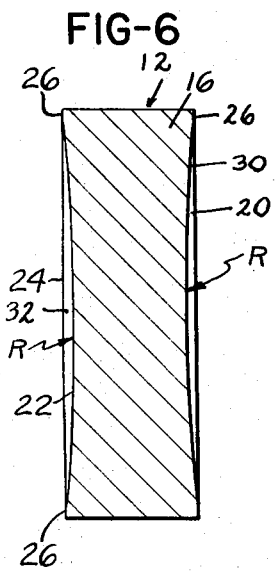
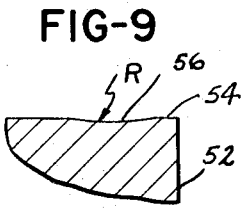
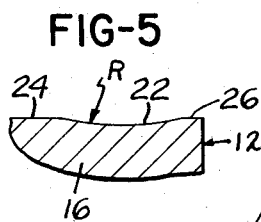
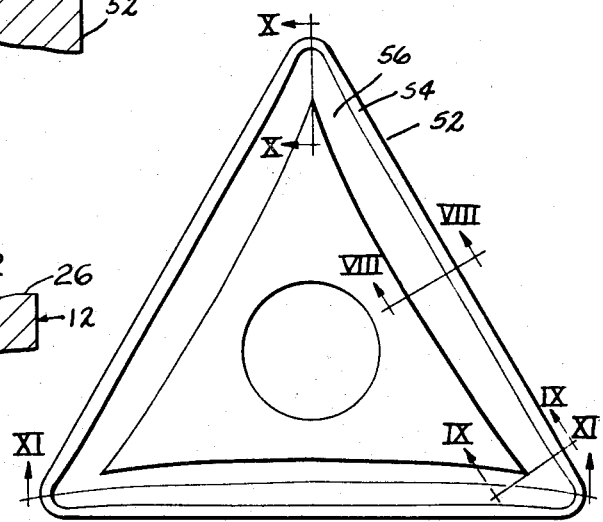
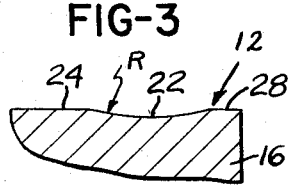
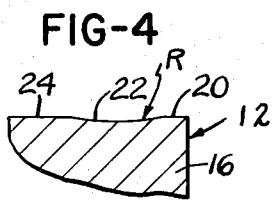

3,383,748
CUTTING INSERT
James M. Galimberti, Latrobe, and Dennis G. Jones, Greensburg, Pa., assignors to Kennametal Inc., Latrobe, Pa., a corporation of Pennsylvania
Filed June 16, 1966, Ser. No. 557,962
19 Claims. (Cl. 29—95)

ABSTRACT OF THE DISCLOSURE

The present invention is drawn to an indexable cutting insert having a cutting edge land and a chip controlling groove about the periphery of the cutting face of the said insert in a closed path wherein the transverse width of the land, or the transverse width and the depth of said groove are varied individually or collectively to provide more favorable clip controlling function when rates and depths of machining feeds are varied with the said insert during operational use.

The present invention is concerned with cutting inserts of the type that are referred to as disposable cutting inserts and which are adapted for being detachably mounted on a tool holder for mounting in a machine tool for turning operations. More particularly still, the present invention is concerned with the formation of the cutting edge land area and the chip controlling groove in such an insert.

In turning operations on metals, a ribbon-like strip of metal is taken off from the workpiece as it is being machined. The strip or ribbon, which is thick or thin depending on the feed rate, is cut off from the workpiece at the edge of the cutting insert and control of this ribbon of metal is important for a number of reasons.

In the first place, if the ribbon-like strip of metal taken off from the workpiece by the cutting insert is not broken up it can feed into the tool holder or other portions of the machine adjacent thereto and cause difficulties either by damaging parts of the tool holder or machine tool and by obstructing the visibility of the working area or by becoming entangled in parts of the machine.

Further, long cut off ribbons of this nature are difficult to handle and can represent a safety hazard to the machine operator.

Preferably, the ribbon-like strip of metal taken off from the workpiece is caused to break up into short pieces or chips which will readily fall away from the machining region into a receiving space or container so that the chips are contained and can easily be removed from the machine tool.

Most disposable cutting inserts of the nature referred to and with which the present invention is concerned are today provided with chip controlling grooves extending therealong spaced inwardly a short distance from the cutting edge of the tool. These grooves are effective for causing the ribbon-like strip of metal taken off from the workpiece to bend and break and to fall away from the cutting tool. While chip controlling grooves or chip breakers, as they are sometimes referred to, are known, it has been discovered that a chip controlling or chip breaker groove of uniform cross section, as such grooves have up to now been made, does not meet all machining conditions. Heretofore, the chip controlling or chip breaker grooves in an insert have been of uniform size and configuration and have thus been defective with respect to controlling or breaking the ribbon of metal taken off under all cutting conditions. For example, a light cut on a workpiece will require one type of chip controlling or chip breaker groove whereas a heavier cut taken on a workpiece will require a chip controlling or chip breaker groove of another nature.

It has been discovered, by considerable testing and experimentation, that a cutting insert of the nature referred to can be provided with a chip controlling or chip breaker groove of the nature referred to, which will meet most machining conditions encountered, by forming the groove to a variable size and configuration so that, as the depth of cut taken by the insert increases, the configuration of the chip controlling or chip breaker groove encountered by the ribbon of metal taken off from the workpiece by the insert will change and efficient control of the ribbon of metal taken off from the workpiece will be maintained.

Cutting inserts of the nature referred to are generally made of extremely hard material, for example, cemented tungsten carbide and the chip controlling or chip breaking grooves are formed therein during the molding process. Since such material is substantially unmachinable after it has been sintered, it is important for the insert to be so formed at the time of its manufacture that it is as widely adaptable as possible because so substantial change in the configuration thereof can be made with any degree of economy after the said sintering operation.

With the foregoing in mind, it is a primary objective of the present invention to provide a cutting insert having a chip controlling or chip breaker groove formed therein which adapts the cutting insert automatically to varying machining conditions.

Still another object of the present invention is the provision of a chip controlling or chip breaking groove in a cutting insert which will provide for different type of controls of the ribbon of metal taken from a workpiece by the cutting insert at different feed rates.

Still another object of this invention is the provision of a method of forming a disposable cutting insert of cemented tungsten carbide or the like in which improved operating conditions will be had.

A particular object of the present invention is the provision of a cutting insert of the nature referred to and a method of making the cutting insert in which improved operating characteristics of the cutting insert is had without substantially increasing the cost of manufacture of the insert.

The foregoing objects as well as still other objects and advantages of the present invention will become more apparent upon reference to the following detailed specification taken in connection with the accompanying drawings in which:

FIGURE 1 is a perspective view showing a tool holder with a disposable cutting insert according to the present invention mounted thereon;

FIGURE 2 is a plan view drawn at increased scale showing a square cutting insert according to the present invention;

FIGURES 3, 4, 5, and 6 are sectional views of the insert of FIGURE 2 and are indicated respectively by section lines III—III, IV—IV, V—V, and VI—VI, respectively, on FIGURE 2;

FIGURE 7 is a plan view showing a triangular cutting insert according to the present invention;

FIGURES 8, 9, 10 and 11 are sections indicated by lines VIII—VIII, IX—IX, X—X, and XI—XI, respectively, on FIGURE 7;

FIGURE 12 is a view of a circular cutting insert having a chip controlling or chip breaking groove according to the present invention;

FIGURES 13, 14 and 15 are sectional views indicated by lines XIII—XIII, XIV—XIV, and XV—XV, respectively, on FIGURE 12; and FIGURE 16 is a view of a cutting insert similar to that of FIGURE 1 but being in the form of a rhombus instead of a square.

Referring to the drawings somewhat more in detail, in FIGURE 1 reference numeral 10 represents a tool holder adapted for being clamped in the carriage or other support provided therefor in a machine tool. Tool holder 10 has a shaped notch or recess in one end in which is disposed a removeable cutting insert 12 which, as mentioned, is preferably made of an extremely hard material such as cemented tungsten carbide.

The insert is clamped in place by a hold down clamp element on the holder bearing or top of the insert or it may be provided with a central hole 14 into which an andjustable clamping member on the tool holder extends. The particular clamping arrangement is not illustrated in FIGURE 1 but it will be understood that it can be any of several well known types which provide for securely holding the insert 12 down on the tool holder and against the surfaces of the notch of the recess provided in the tool holder for receiving the insert.

The insert 12 of FIGURE 1 is shown drawn at enlarged scale in FIGURE 2 wherein it will be seen to comprise a body 16 of cemented tungsten carbide having flat parallel top and bottom faces and in the form of a square in plan view and having rounded corners or noses at 18. The insert has a peripheral surface which extends between the top and bottom faces and forms sharp corners therewith.

The insert has a flat cutting edge land area 20 extending completely thereabout and immediately inwardly of cutting edge land area 20 is the chip controlling or chip breaking groove 22 according to the present invention. Inwardly of groove 22 is an island area 24 which provides the principal surface on which the insert rests in the tool holder 10. Island area 24 on top of the insert is also engaged by a clamp member when the insert is clamped to the tool holder 10 by a clamp element which does not extend through the aforementioned central hole 14.

As will be seen from FIGURE 2 and sectional views FIGURES 3, 4, 5, and 6, the cutting edge land area 20 is thinnest in a direction in the plane of the cutting insert at points 26 at the rounded corners or noses 18 and is somewhat thicker in the center midway between the noses at points 28. The back edge of the cutting edge land area is curved from adjacent each nose to the next adjacent noses and, thus, a variable width is presented by the cutting edge land area as the feed rate changes.

Furthermore, as will be seen in FIGURES 2 through 6, the lateral width of the groove varies from end to end, being narrowest at points 30 near the rounded corners or noses 18 and widest at points 32 in the center of each side of the cutting insert halfway between the noses.

Still further, as will be observed particularly upon reference to FIGURES 3, 4, 5, the groove along each edge of the insert is deepest in the center of the length of each groove at point 32 and more shallow near the ends of the groove at points 30 and most shallow at points 34 where the grooves along the adjacent edges meet.

Still further, it will be evident that the groove at any section taken thereacross laterally of the groove is formed to a uniform radius. A single uniform radius is also to be found in a formation of the groove in FIGURE 6. The advantage of using single uniform radii to form the groove is that the manufacture of the cutting insert is much simpler and more inexpensive than if the groove were in the form of a compound curve with, for example, one side of the groove having a different curvature than the other side.

Cutting inserts of the type having variable radii are shown, for example, in the Franko Patent No. 3,187,406. Patent 3,187,406 represents an attempt to control and break chips utilizing compound radii on the cutting groove. However, to construct an insert in this manner represents an added expense because of the difficulty of properly forming the molds and dies in which the insert is made. By the practice of the present invention, the insert can be formed much more simply and more exactly than would be the case if compound curves were employed because only simple curves must be developed in the molds and dies.

The varying cutting edge land and the groove of varying width and depth result in a cutting edge land which is narrow at the nose radius at each of the rounded corners 18 and a groove that is both narrow and shallow in the same region.

At a point midway between the nose radii the cutting edge land area is at its widest and the groove is also at its widest and deepest. The described variation in the cutting edge land area width plus the variation in the width and depth of the chip controlling or chip breaking groove results in a cutting insert that will efficiently control the chips at light chip loads as well as heavy chip loads and also at any chip load falling between what would be considered a low feed rate and an extremely high feed rate.

As will also be noted, in FIGURES 3, 4, 5, and 6, the central island area 24 is preferably coplanar with the cutting edge land area 28. This represents an advantage because the maximum possible support is provided for the cutting edge when the insert is placed in a tool holder.

With reference to the placing of the insert in a tool holder, the inserts are ordinary two sided, as will be seen in FIGURE 6, and rest on a hard flat surface of the tool holder, preferably provided by a flat shim formed of cemented tungsten carbide. FIGURE 1 shows such a shim at 50. Due to the heavy load imposed on the cutting insert on the working land area exposed on the top, it is extremely important to have as much support at the bottom of the cutting insert as possible in order to eliminate breakage of the cutting insert. The cutting edge land area on the bottom of the insert will thus contribute to the supporting of the cutting edge land area on top of the insert in working position and breakage of the inserts is thereby substantially eliminated. By formation of the cutting insert according to the present invention, therefore, support can be provided for the cutting insert completely to the edge thereof and the cutting edge land area is thus supported with maximum firmness.

As to the triangular insert 52 illustrated in FIGURES 7 through 11, substantially the same comments obtain. This cutting insert is also characterized in a cutting edge land area 54 that varies in width from one nose of the insert to the adjacent noses and a chip controlling or chip breaker groove 56 which likewise varies in width and depth from each nose of the insert to the adjacent noses.

The insert 58 of FIGURE 16 is quite similar to that of FIGURE 1 except that, instead of being square, it is in the form of a rhombus.

The circular insert 60 of FIGURES 12, 13 and 14 is similar to the inserts described above except that, due to the circular formation of the insert the cutting edge land area 62, varies also, but is more uniform in width about the periphery of the insert. The groove 64, however, varies substantially in width and depth from point to point about the insert as shown.

It has been found that a satisfactory and widely useable insert can be made to a circular configuration by locating the narrow regions 40 of the groove circumferentially about the cutting insert at intervals of 22½ degrees. It is at these points that the groove is narrowest and most shallow. At intervals of 22½ degrees there would be sixteen of such points about the periphery of the circular tool and this has been found to be satisfactory to accommodate the circular cutting insert to substantially all cutting conditions.

It is to be understood, however, that the spacing of the regions 40 is not intended to be limited to 22½ degrees but that these intervals might be somewhat closer or wider apart, if so desired.

The circular insert thus embodies the features of the groove of varying width and depth and formed so as to have a single cross sectional radius and with the cutting edge land area and the center island preferably in the same plane, for maximum support of the insert and the cutting edge.

The groove of varying width and depth produces chip control at light chip loads as well as at heavy chip loads. The circular insert also causes a stress-riser action on the chip to further control and break the chip. The circular insert could, of course, be provided with means for orienting the insert when indexed if so desired in order to present the groove in the proper position with respect to the active portion of the cutting edge land of the insert.

It has been mentioned that the cutting edge land area of the circular insert does not vary in width as pronouncedly as those of the insert having straight sides but it will be understood that it is intended to include within the purview of the present invention, circular cutting inserts having a cutting edge land area substantially uniform in width about the entire periphery of the insert and also circular inserts in which the width of the cutting edge land area varies in such a manner as to be thinnest near points 40 and widest intermediate to the said points. It has been found that, with a circular insert of the nature known, the variable chip controlling or chip breaker groove produces a highly satisfactory result even when the land area forming the cutting edge about the periphery of the insert is substantially uniform in width.

It will be understood that this invention is susceptible to modification in order to adapt it to different usages and conditions; and accordingly, it is desired to comprehend such modifications within this invention as may fall within the scope of the appended claims.

What is claimed is:

1. A cutting insert having parallel top and bottom faces and a peripheral surface extending between said faces and forming sharp edges at the juncture thereof with faces, at least one of said faces having a chip controlling groove formed therein spaced inwardly from the edges of said face so as to leave a cutting edge land area between the said edges of the face and the adjacent side of the said groove, said groove extending in a closed path about said one face so as to leave a cutting edge land area which extends completely around the insert, said groove being arcuate in cross section, and at least one of said groove and cutting edge land area varying in transverse width along the length thereof.

2. A cutting insert according to claim 1 in which both of said groove and cutting edge land area vary in transverse width along the length thereof.

3. A cutting insert according to claim 2 in which said groove also varies in depth along the length thereof.

4. A cutting insert according to claim 3 in which said groove is deepest in the region of greatest width thereof.

5. A cutting insert according to claim 4 in which said cutting edge land area is widest in the region of greatest depth and width of said groove.

6. A cutting insert according to claim 5 in which the portion of said one face inside said groove is coplanar with the cutting edge land area outside said groove.

7. A cutting insert according to claim 6 in which said groove has the same curvature at every transverse cross section.

8. A cutting insert according to claim 7 in which said insert has grooves in both faces thereof.

9. A cutting insert according to claim 1 in which the peripheral surface of said insert comprises a plurality of flat walls and rounded noses at the junctures of said walls and both of said groove and cutting edge land area vary in width along the length thereof, said cutting edge land area having its narrowest points at said rounded noses and its widest points midway between said noses and having the edge on the groove side curving from each of said widest point to the adjacent narrowest points, said groove having its narrowest points at said rounded noses and its widest points midway between said noses and having the edge thereof remote from said cutting edge land area curving from each of said widest points thereof to the adjacent said narrowest points thereof.

10. A cutting insert according to claim 9 in which said groove also varies in depth along the length thereof and is deepest at said widest points thereof and shallowest at said narrowest point thereof.

11. A cutting insert according to claim 10 in which said groove is uniform in curvature in transverse cross section.

12. A cutting insert according to claim 11 in which the said groove in longitudinal cross section has its bottom wall formed to a uniform curvature.

13. A cutting insert according to claim 12 in which said insert is square.

14. A cutting insert according to claim 12 in which said insert is triangular.

15. A cutting insert according to claim 12 in which said insert is a parallelogram.

16. A cutting insert according to claim 1 in which said insert is circular and said groove varies in width so as to have a plurality of narrow regions therein spaced uniformly about the insert with the groove widening between said narrow regions so as to be widest midway between said narrow regions.

17. A cutting insert according to claim 16 in which said groove has the same curvature at each transverse section therealong.

18. A cutting insert according to claim 17 in which said groove varies in depth so as to be deepest where it is widest and most shallow where it is narrowest and having its bottom wall when viewed in longitudinal cross section formed to a uniform curvature.

19. A cutting insert according to claim 1 in which said cutting edge land area is coplanar with the portion of the pertaining face which is inside said groove.

References Cited

UNITED STATES PATENTS

| | | | |
|---|---|---|---|
| 1,756,516 | 4/1930 | Klopstock | 29—95 |
| 3,137,917 | 6/1964 | Dowd | 29—95 |
| 3,187,406 | 6/1965 | Franko | 29—95 |
| 3,279,034 | 10/1966 | Kaiser | 29—95 |

FOREIGN PATENTS 315,005  10/1919  Germany.

HARRISON L. HINSON, *Primary Examiner.*